F. H. DUNN.
HOLDER FOR VEHICLE LICENSES.
APPLICATION FILED JULY 19, 1920.

1,403,302.

Patented Jan. 10, 1922.

Inventor
Francis H. Dunn
By
Attys.

UNITED STATES PATENT OFFICE.

FRANCIS H. DUNN, OF MONTREAL, QUEBEC, CANADA.

HOLDER FOR VEHICLE LICENSES.

1,403,302.  Specification of Letters Patent.  Patented Jan. 10, 1922.

Application filed July 19, 1920. Serial No. 397,296.

*To all whom it may concern:*

Be it known that I, FRANCIS H. DUNN, a subject of the King of Great Britain, and resident of the city of Montreal, in the Province of Quebec and Dominion of Canada, have invented certain new and useful Improvements in Holders for Vehicle Licenses, of which the following is a full, clear, and exact description.

This invention relates to improvements in license plates for automobiles and the like, and the object of the invention is to provide a plate which will positively identify itself with the car and the owner thereof.

A further object is to provide a license plate which will be substantially proof against tampering or alteration and which will give indication of any tampering.

The device consists briefly of a sheet of suitable material impressed with the license number and the name of the province or state issuing same and having space provided for the recording of suitable data to identify the car and owner with the license number. This sheet of material is mounted under seal in a suitable carrier which may be attached to the car and which includes a transparent panel, through which the license number and other information on the sheet may be examined without breaking the seal.

In the drawings which illustrate the invention:—

Figure 1:
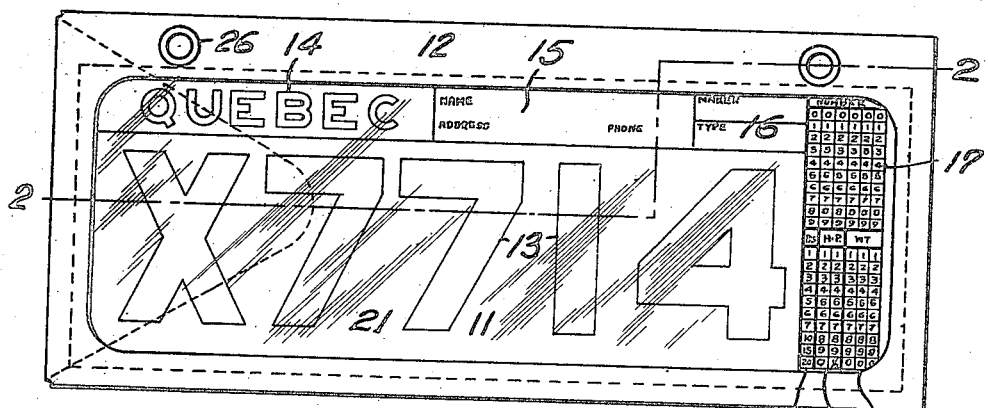
Fig. 1 is a plan view of the device.
Figure 2:
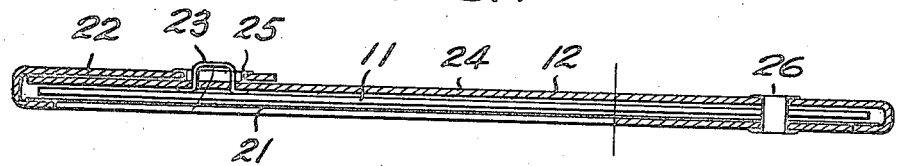
Fig. 2 is a section on the line 2—2, Figure 1.
Figure 3:
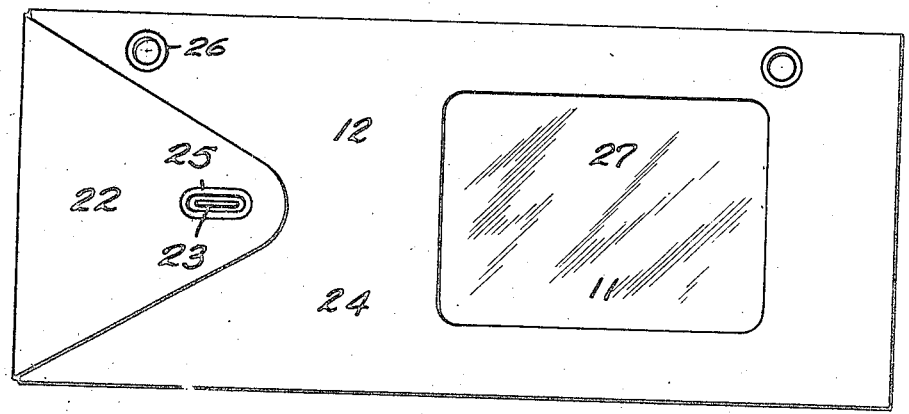
Fig. 3 is a bottom plan view.

Referring more particularly to the drawings, 11 designates the inscription carrying sheet and 12 the holder therefor. The sheet 11 is impressed by printing or otherwise with the license number 13 and the name 14 of the province or state issuing the license, these being preferably in large type easily read at a distance as is customary. A space 15 is provided on the card 11 for the inscription of the license owner's name, address and other identification. The card may also be provided with any suitable number of spaces 16 for the inscription of a general identification of the vehicle, such as the maker's name and the type of vehicle, i. e., whether pleasure-car, truck, buss or motor cycle. At any suitable part of the card, as shown at 17, the ten digits are printed a suitable number of times, so that the proper selection of numbers may be indicated by punching out to record the serial number of the vehicle. Similarly printed spaces 18, 19 and 20 may be provided for recording in like manner respectively the number of passengers the vehicle is designed to carry, and horse power of the engine and the weight or capacity of the vehicle. Obviously any additional information may be recorded in a similar manner by the use of suitable symbols. Obviously the method of recording and description of the vehicle is not limited to punching out numbers or symbols, but may be effected by blocking out all the numbers or symbols not desired; or in any other suitable manner. It will also be understood that the spaces 17, 18, 19 and 20 may be blank and the desired information inscribed in an ordinary manner.

The holder 12 is a casing of suitable material, preferably waterproof, having a transparent panel 21 through which the data on the card 11 may be seen. This casing, which is of an oblong shape to correspond with the card 11, is open preferably at one end for the insertion of the card and is provided with a closure member or flap 22 having any suitable means for holding the same in closed position and under seal. A simple and satisfactory holding means comprises a staple or eye 23 carried by the back of the holder and adapted to project through a grommet 25 carried by the closure member 22. The staple 23 is preferably adapted to project slightly above the surface of the closure member, so that the wax or other material forming a seal may run under the same or so that a locking pin may be provided in the well known manner to relieve the seal itself of stress. One of the longer edges of the casing may be provided with any suitable number of grommets 26 forming reinforced openings, through which attaching members may pass to connect the device to a vehicle.

If desired, the back 24 of the casing may be provided with a transparent panel 27, through which the back of the card 11 may be seen. This arrangement will provide for the recording on the back of the card of the data previously described as recorded on the face thereof or will serve to place in view additional data.

When a license is issued, the issuing officer records on the card 11 the name and address, etc., of the licensee and all desired data of the vehicle which is being licensed.

This data positively identifies the license number with the owner and also identifies the license number with a particular car of a particular description. The card is then placed in the holder 12 and the closure flap sealed by means of wax or other composition or by means of a metal seal, such as used on freight cars. The licensee then mounts the holder on his vehicle in the same manner that license plates are ordinarily mounted.

The license plate now gives a complete identification of the car and owner and, as the identification is easily available for examination, traffic police or special inspectors may ascertain in a moment whether the license is being used on the car for which it was purchased. In the event of trouble or accident, the owner of the license may be immediately identified. If a traffic policeman or inspector finds a car being driven with an unsealed license, the person in charge of the car is immediately brought under suspicion of having tampered with the data of the card or of having substituted an unauthorized card and proper investigation may be immediately made. A license of this character will be very effective in checking thefts of automobiles by rendering identification easy and will also be of assistance to governments in checking fraudulent use of licenses.

Having thus described my invention, what I claim is;—

An identifying means for automobiles and the like, comprising an identification card and a protective holder therefor, said card having on its face license number designations, and means for unalterably identifying the license with the vehicle for which it is used, and on its back toward one end space for inscription of further identification, and said holder comprising a receptacle adapted for attachment to the vehicle, comprising a transparent front portion disclosing substantially the whole front of the card, and the transparent back portion disclosing an inscription bearing portion of the card back, and closure means for said holder overlying the holder back and provided with fastening and seal holding means, whereby the holder may be sealed on its back and the seal thereby protected from damage and yet readily accessible for inspection during the use of the device.

In witness whereof, I have hereunto set my hand.

FRANCIS H. DUNN.